United States Patent
Fiorentino et al.

(10) Patent No.: US 12,311,976 B2
(45) Date of Patent: May 27, 2025

(54) METHOD OF DETECTING AN INTERFERENCE SOURCE IN AN INDUSTRIAL FACILITY

(71) Applicant: Siemens Aktiengesellschaft, Munich (DE)

(72) Inventors: Vincenzo Fiorentino, Nuremberg (DE); Siegfried Richter, Lauf (DE)

(73) Assignee: Siemens Aktiengesellschaft, Munich (DE)

( * ) Notice: Subject to any disclaimer, the term of this patent is extended or adjusted under 35 U.S.C. 154(b) by 54 days.

(21) Appl. No.: 17/924,339

(22) PCT Filed: Apr. 7, 2021

(86) PCT No.: PCT/EP2021/059024
§ 371 (c)(1),
(2) Date: Nov. 9, 2022

(87) PCT Pub. No.: WO2021/228473
PCT Pub. Date: Nov. 18, 2021

(65) Prior Publication Data
US 2023/0174109 A1 Jun. 8, 2023

(30) Foreign Application Priority Data

May 14, 2020 (EP) .................................... 20174637
May 26, 2020 (EP) .................................... 20176515

(51) Int. Cl.
*B60W 60/00* (2020.01)
*H04W 24/02* (2009.01)
*H04W 64/00* (2009.01)

(52) U.S. Cl.
CPC ...... *B60W 60/0025* (2020.02); *B60W 60/001* (2020.02); *H04W 24/02* (2013.01); *H04W 64/003* (2013.01); *B60W 2756/10* (2020.02)

(58) Field of Classification Search
CPC ....... H04W 24/02; H04W 4/60; H04W 12/12; H04W 12/128; H04W 24/04;
(Continued)

(56) References Cited

U.S. PATENT DOCUMENTS 6,965,325 B2 * 11/2005 Finnern ............ G08G 1/096838
340/995.23
8,862,397 B2 * 10/2014 Tsujimoto ............ G05D 1/0297
701/517
(Continued)

FOREIGN PATENT DOCUMENTS

EP 2806604 A1 * 11/2014 ............. H04L 45/22
EP 2890079 A1 * 7/2015 ............. G06N 20/00
(Continued)

OTHER PUBLICATIONS

PCT International Search Report dated May 7, 2021 based on PCT/EP2021/059024 filed Apr. 7, 2021.

Primary Examiner — Babar Sarwar
(74) Attorney, Agent, or Firm — Cozen O'Connor

(57) ABSTRACT

A method of detecting a malicious interference source in a wireless network in an industrial facility includes receiving network quality information from a plurality of network devices, detecting a degradation in a section of the network based on the network quality information from at least one network device, determining a geographical area associated with the section of the network, and determining a location of the malicious interference source based on measurements of at least one network key performance indicator (KPI) from at least one mobile unit in the geographical area.

12 Claims, 7 Drawing Sheets

(58) Field of Classification Search
CPC ..... H04W 84/00; H04W 88/08; H04W 88/12; H04W 88/16; H04W 88/18; H04L 25/03987; H04L 41/5025; H04L 43/091; H04L 63/1425; B60W 2756/10; B60W 60/001; B60W 60/0025
See application file for complete search history.

(56) References Cited

U.S. PATENT DOCUMENTS

| | | | | |
|---|---|---|---|---|
| 11,222,545 B2* | 1/2022 | Yeh | ................... | G08G 5/0069 |
| 2012/0129517 A1* | 5/2012 | Fox | ................... | H04W 24/02 |
| | | | | 455/425 |
| 2013/0033290 A1* | 2/2013 | King | ................... | H04L 25/0276 |
| | | | | 327/108 |
| 2014/0347978 A1* | 11/2014 | Kim | ................... | H04W 40/12 |
| | | | | 370/225 |
| 2015/0188935 A1* | 7/2015 | Vasseur | ................ | H04W 12/12 |
| | | | | 726/23 |
| 2016/0328968 A1* | 11/2016 | Elsheemy | ............. | B60K 35/00 |
| 2017/0243494 A1* | 8/2017 | Taveira | ................ | G05D 1/106 |
| 2018/0033244 A1* | 2/2018 | Northrup | ............... | H04W 4/21 |
| 2018/0322791 A1* | 11/2018 | Brooks | ................ | B61C 17/12 |
| 2019/0069241 A1* | 2/2019 | Gilson | ................ | H04L 1/1607 |
| 2019/0109632 A1* | 4/2019 | Kosseifi | ............... | H04W 4/026 |
| 2019/0279440 A1* | 9/2019 | Ricci | ................. | G06Q 10/20 |
| 2019/0302798 A1* | 10/2019 | Winkle | ............... | H04W 4/46 |
| 2019/0349944 A1* | 11/2019 | Beattie, Jr. | ............ | H04W 24/02 |

FOREIGN PATENT DOCUMENTS

| | | | | |
|---|---|---|---|---|
| EP | 3557899 | | 10/2019 | |
| EP | 3557899 A1 * | | 10/2019 | ............ H04W 16/18 |
| WO | WO-2015132759 A1 * | | 9/2015 | ......... H04L 65/4084 |

* cited by examiner

METHOD OF DETECTING AN INTERFERENCE SOURCE IN AN INDUSTRIAL FACILITY

CROSS-REFERENCE TO RELATED APPLICATIONS

This is a U.S. national stage of application No. PCT/EP2021/059024 filed 7 Apr. 2021. Priority is claimed on European Application Nos. 20174637.7 filed 14 May 2020 and 20176515.3 filed 26 May 2020, the contents of which are incorporated herein by reference in their entirety.

BACKGROUND OF THE INVENTION

1. Field of the Invention

The current invention relates to wireless communication in industrial automation environments and, more specifically, to robust and secure wireless communication in industrial facilities.

2. Description of the Related Art

With the increasing implementation of industrial internet of things and other Industry 4.0 concepts in factories, plants and other industrial facilities, a plurality of assets in these facilities will be connected wirelessly. Several wireless networks and technologies such as cellular networks, local area networks, short range communication techniques such as Bluetooth, and/or Near Field Communication, may be utilized in enabling wireless communication. However, with an increased utilization of wireless communication, penalty from wireless security threats, also increases considerably.

The current invention relates to security techniques for industrial wireless communication and more particularly to detection of jamming sources in industrial facilities.

A jamming source (also referred to as a malicious interference source) is a radio device that is capable of generating interfering signals (also referred to as jamming signals) to disturb or block a radio communication within its radio range. Jamming signals can block the radio communication between a transmitter and a receiver by causing strong interference in the frequency band used by the transmitter and receiver.

A plurality of jamming techniques is used to create interference and disrupt wireless communications. Some of the common techniques include transmitting white noise or a single tone jammer operating constantly on a fixed frequency, transmitting a jamming with a fixed or random pattern each time on different frequencies, and/or transmitting a jamming signal simultaneously over multiple frequencies. Certain jamming techniques are reactive and difficult to detect. For example, in an example a jammer may listen to a particular channel and determine the channel schedule. Based on the determined channel schedule, the jammer may transmit only during select times as per the channel schedule. In a further case, the jammer may receive the signal to be attacked and utilize the signal as the jamming signal by amplifying and re-transmitting the amplified signal to cause interference.

In the context of industrial environments, such jamming attacks can severely slow down or even block the entire production processes. Additionally, a jamming attack can have serious safety impact when equipment is used in collaborative operation with human personnel. Accordingly, there is a need for a method and device to address the issues mentioned above.

SUMMARY OF THE INVENTION

In view of the foregoing, it is an object of the invention to provide methods, a network management device, an automated guidance vehicle and a non-transitory storage mediums that provide robust and secure wireless communication in industrial facilities.

These and other objects of the invention are achieved in accordance with the invention by a method of detecting an interference source in a wireless network in an industrial facility. The wireless network comprises a plurality of network devices. The method comprises receiving network quality information from the plurality of network devices, detecting a degradation in a section of the network based on the network quality information from one or more network devices from the plurality of the network devices, determining a geographical area associated with the section of the network based on the network quality information from the one or more network devices in the section of the network and determining a location of the interference source based on measurements of at least one network key performance indicator (KPI) from at least one mobile unit in the geographical area.

Network quality information from a corresponding network device includes at least one network KPI indicative of signal quality at a corresponding network device, and a network identifier of the corresponding network device. The section of the network comprises the at least one network device. In an example, the at least one mobile unit is an automated guidance vehicle. In the example, the method further comprises determining a route plan for the automated guidance vehicle based on the determined geographical area and network topology of the section of the network. The automated guidance vehicle is configured to move along a route comprising a plurality of route locations in the geographical area based on the determined route plan and measure the at least one network KPI at each location from the plurality of route locations.

Accordingly, the current invention addresses jamming attacks in industrial facility by locating the interference source. Additionally, based on the utilization of the mobile unit, the current invention can locate the interference source accurately. Subsequent to the localization of the interference source, various security actions may be taken to mitigate the interference source.

In an example, the plurality of network devices comprises at least one gateway device affixed to a plurality of locations in the industrial facility, and at least one user device connected to the wireless network via the at least one gateway device. In an example, the at least one network KPI includes a Residual Signal Strength Indicator (RSSI), a Signal to Interference plus Noise Ratio (SINR) and a Packet Error Rate (PER).

In an example, determining a geographical area associated with the first section of the network comprises determining a location of each network device from the at least one network device based on the network identifier of the corresponding network device and network topology of the wireless network; and determining the geographical area based on the at least one location of the at least one network device in the section of the network.

In an example, network quality information from each user device from the at least one user devices, further comprises location information indicative of a location of the corresponding user device.

In an example, the method further comprises coordinating with a radio localization device comprising at least one set of directional antennas fixed along a plurality of corresponding directions for determining the location of the interference source.

In another embodiment, the current invention discloses a method of detecting a malicious interference source by an automated guidance vehicle in an industrial facility. The automated guidance vehicle is connected to a wireless network via a gateway device. The method comprises performing a first production task in a production mode, detecting a degradation in at least one of network KPI associated with a connection between the automated guidance vehicle and the gateway device, switching from the production mode to an interference detection mode, based on the detected degradation in the at least one network KPI, obtaining a route plan, where the route plan comprises a plurality of locations in the industrial facility, and measuring the at least one network KPI at each location in the route plan, for transmitting measurements of the at least one network KPIs to a network management device associated with the wireless network. The first production task is generated by an automated guidance vehicle controller connected to the automated guidance vehicle via the wireless network. The measurements of at least one network KPI from the plurality of locations in the route plan, is used by the network management device for detecting the location of the malicious interference source.

Accordingly, the current invention addresses a method for determining a location of the interference source using an existing automated guidance vehicle and therefore does not require human intervention. Additionally, dedicated hardware for performing this may also not be required.

In an example, measuring the at least one network KPI at each location comprises measuring the at least one network KPI using a radio antenna of the automated guidance vehicle in a first orientation and measuring the at least one KPI using the radio antenna of the automated guidance vehicle in a second orientation. Based on measuring the network KPIs in two orientations, the localization of the interference source is improved.

In an example, switching from the production mode to an interference detection mode comprises evaluating a degree of the degradation in the connection between the automated guidance vehicle and the gateway device. Accordingly, based on the degree of degradation, it is possible to determine whether the automated guidance vehicle can perform the first production task while experiencing the degradation. In an example, the detected degradation is caused by at least one jamming signals from the interference source.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following detailed description references the drawings, in which.

DETAILED DESCRIPTION OF THE EXEMPLARY EMBODIMENT

Figure 1:
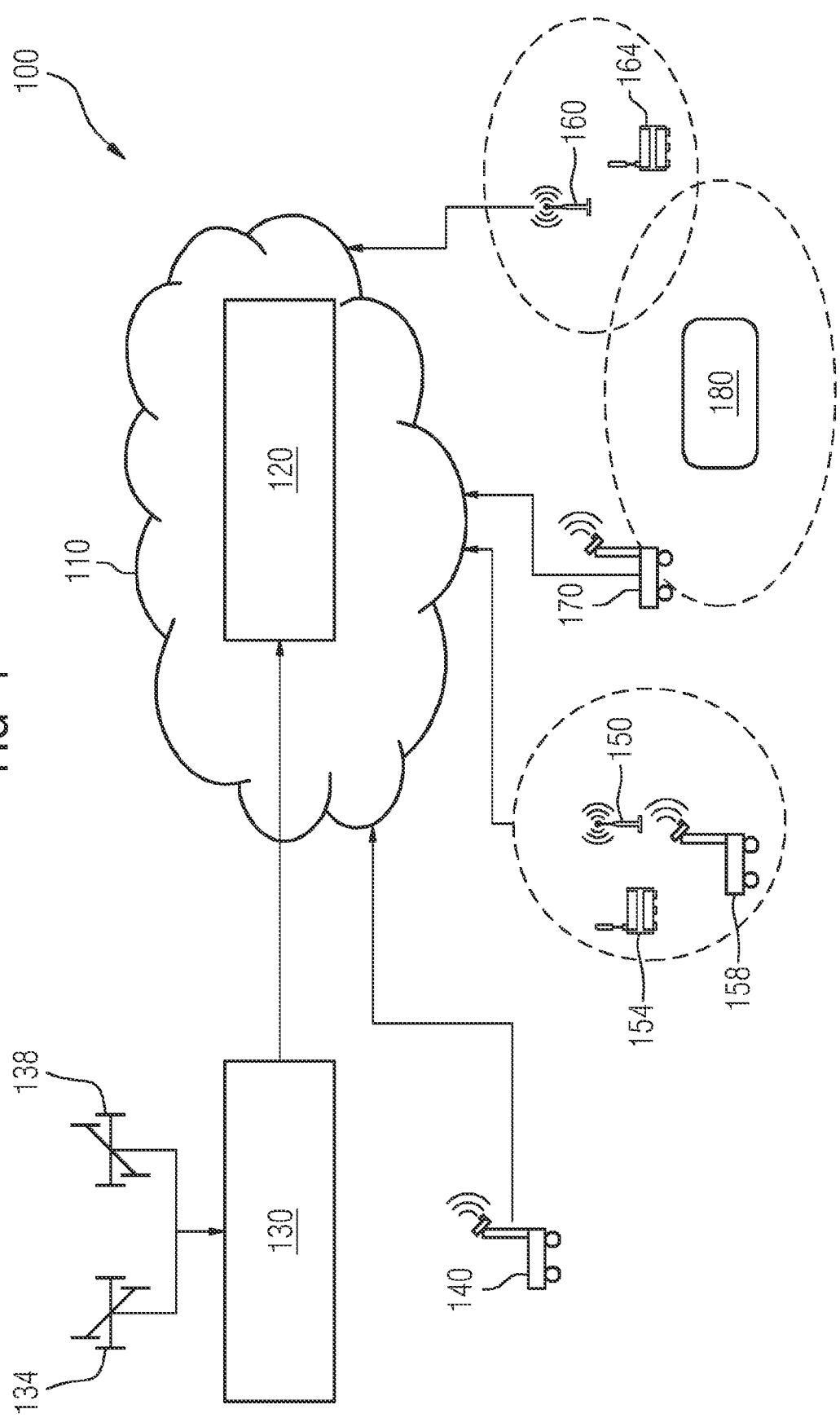
FIG. 1 illustrates an exemplary section of an example industrial facility comprising a network management device capable of detecting a jamming source in the industrial facility in accordance with the invention.

FIG. 1 illustrates a section 100 of an industrial wireless network in an industrial facility. Industrial facility herein refers to any environment where at least one industrial process such as manufacturing, refining, smelting, assembly of equipment may occur and includes process plants, oil refineries, and/or automobile factories. The industrial system includes a plurality of control devices such as process controllers, programmable logic controllers, supervisory controllers, automated guidance vehicles, robots, and/or operator devices. At least one control device is connected to a plurality of field devices (not shown in figure) such as actuators and sensor devices for monitoring and controlling industrial processes in the industrial facility. These field devices can include but is not limited to flowmeters, value actuators, temperature sensors, and/or pressure sensors. The control devices may be connected to each other via a control network (realized via wired and wireless networks). Additionally, the industrial system includes a plurality of mobile units including at least one robot for performing a plurality of operations such as welding, assembly of parts, at least one autonomous guidance vehicles for transportation and handling of material, and/or at least one asset with RFID tags on conveyor belts in the industrial plant. Additionally, the industrial system may include an operator station for displaying the status of the industrial plant to an operator and for allowing the operator to define key performance indicators (KPIs) for the control of the industrial processes in the facility.

Communication in the industrial facility occurs via wired and wireless networks. A section 100 of such a wireless network is illustrated in FIG. 1. The wireless network comprises a plurality of network devices (140, 154, 150, 158, 170, 160, 164). The plurality of network devices (140, 154, 150, 158, 170, 160, 164) includes a plurality of control devices (154, 158, 170, 164) and a plurality of industrial gateway devices (150, 160; also referred to as gateway devices). Gateway devices herein refers to at least one network devices capable of connecting other network devices such as end devices to the wireless network. Examples of gateway devices include routers, switches, and/or relays.

The plurality of gateway devices are affixed to a plurality of locations in the industrial facility. The plurality of the control devices (154, 158, 170, 164) in the facility are connected to at least one industrial gateway devices (154, 158, 170, 164) for connecting to the wireless network and for communicating information with the other devices and systems in the industrial facility.

The wireless network further comprises a network management device 120 for managing the wireless network. The network management device 120 is configured to detect jamming or interference sources (including unintentional and malicious interference sources) and take at least one action to mitigate interference in the wireless network. The network management device 120 can connect to the mobile units such as the at least one automated guidance vehicle (140, 158, 170) for determining the location of the interference sources. Similarly, the network management device 120 is connecting to a radio localization device 130 for determining the location of the interference sources. This is explained in the description of FIG. 2.

It may be noted by a person skilled in the art that the interference source may be located within the industrial facility or outside the physical premises of the industrial facility. While the interference source may be physically present outside the industrial facility, the jamming signals may be able to impact the wireless network within the industrial facility.

Figure 2:
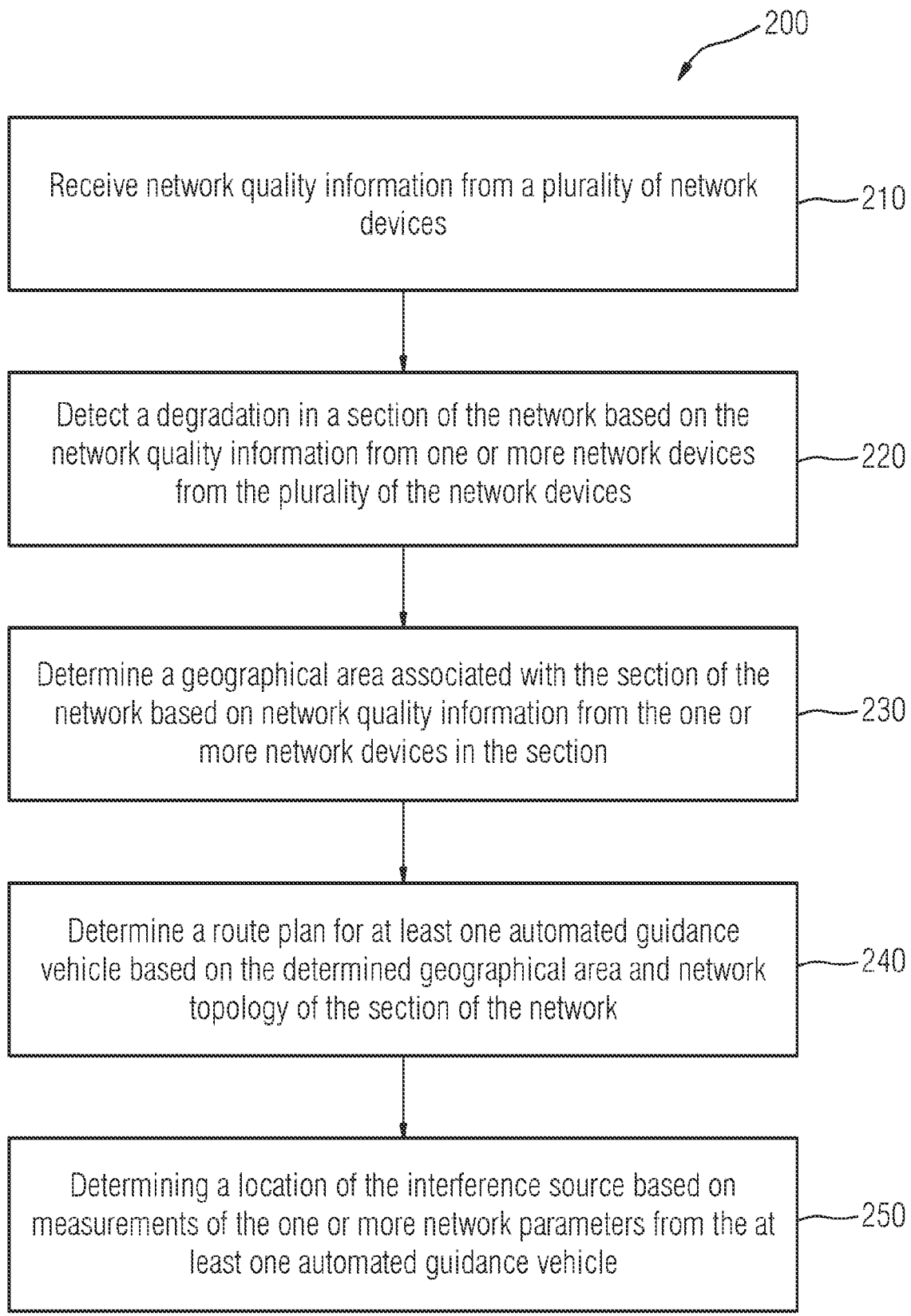
FIG. 2 illustrates an exemplary method for determining an interference source in the wireless network in the industrial facility in accordance with the invention.

FIG. 2 illustrates a method 200 of detecting an interference source 180 in the wireless network in the industrial facility. The method 200 is realized by the network management device 120.

At step 210, the network management device 120 receives network quality information from the plurality of network devices (150, 154, 158, 160, 164, 168, 170, 174). Network quality information from a corresponding network device includes at least one network key performance indice (KPIs, also referred to as network KPIs) indicative of signal quality at a corresponding network device, and a network identifier of the corresponding network device. Network identifier herein refers to any identifier used to identify the network device. Examples of network identifiers include Internet Protocol (IP) address, Media Access Control (MAC) address, International Mobile Subscriber Identity (IMSI), Mobile Station International ISDN Number, or other defined according to the technology used, etc. Examples of network KPIs that are indicative of signal quality, include Residual Signal Strength Indicator (RSSI), Signal to interference plus noise ratio (SINR), Packet Error Rate (PER), data latency, data rate and modulation scheme used by the corresponding network device.

In an example, the at least one network KPIs are grouped into three categories: 1) performance KPIs, 2) radio KPIs and 3) system parameters. Performance KPIs herein refers to at least one network KPI associated with network performance. Examples of performance KPIs include latency, and/or data rate. Radio KPIs herein refers to KPIs indicative of in-band interference level. Examples of radio KPIs include Residual Signal Strength Indicator (RSSI), Signal to interference plus noise ratio (SINR), Packet Error Rate (PER). System parameters herein refers to parameters indicative of network and radio configuration of the corresponding network device from which the network quality information is transmitted. Examples of system parameters includes modulation scheme used by the corresponding device, etc.

In the step 220, the network management device 120 detects a degradation in a section of the wireless network based on the network quality information from at least one network device (170, 160, 164) from the plurality of network devices (150, 154, 158, 160, 164, 168, 170, 174). For detecting the degradation in the section of the wireless network, the network management device 120 analyses the values of the network KPIs from each of the network device from the plurality of network devices.

In an example, if the values of the network KPIs are outside of a certain predefined threshold range, then the network management device 120 determines that the corresponding network device is experiencing network degradation. The threshold range may be determined based on historic values. In an example, the network management device utilizes the three categories of network KPIs to determine whether a network device is experiencing a network degradation. This is further illustrated using an example shown in FIG. 4 with performance KPIs category.

Figure 4:
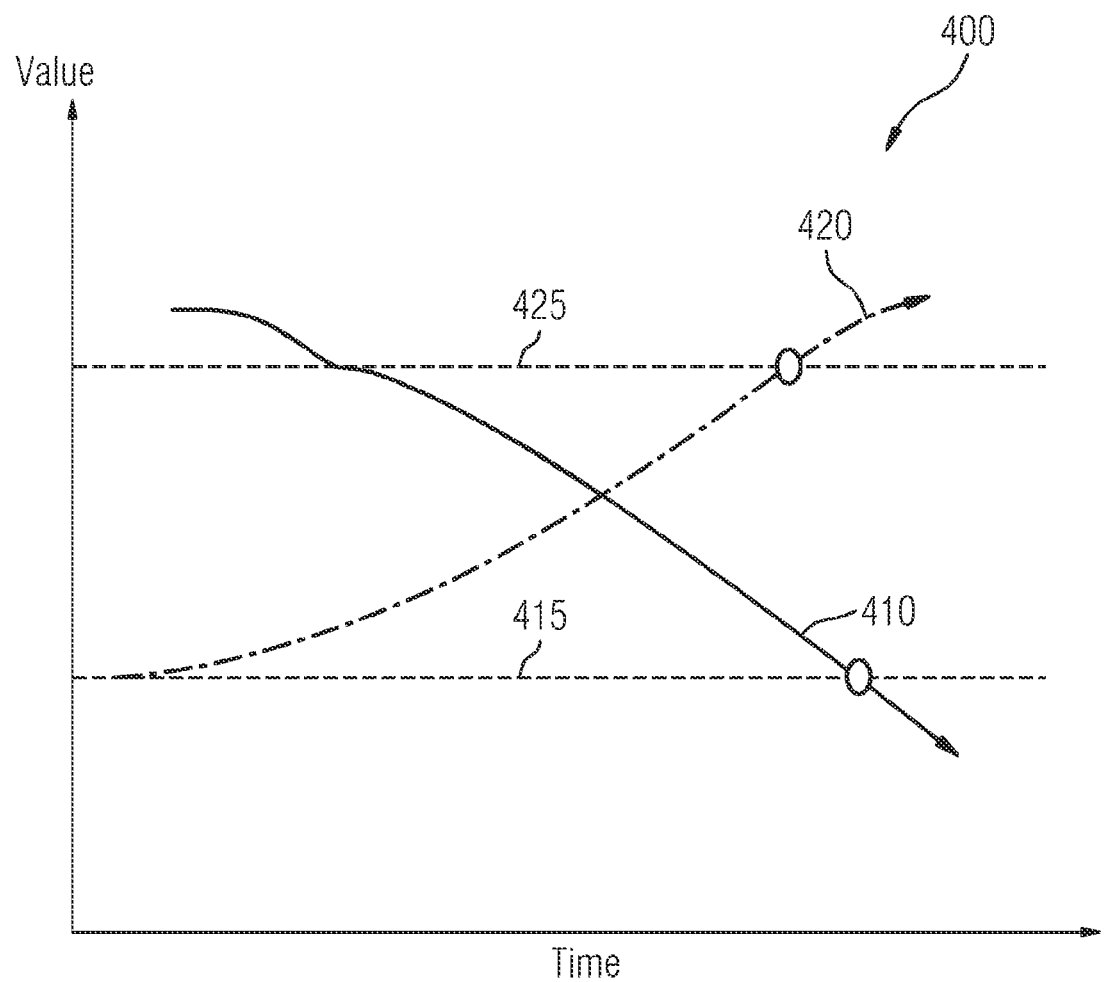
FIG. 4 illustrates example trends of two exemplary performance KPI data latency and data rate associated with an exemplary network device in accordance with the invention.

FIG. 4 illustrates trends of two performance KPIs data latency and data rate associated with a network device. Data latency is represented using curve 420 and Data rate is represented using curve 410. Line 425 represents an upper limit for data latency. Similarly, line 415 represents a lower limit for data rate. If, data latency is above the defined threshold vale (as shown in line 425) or if the data rate is below the threshold value (as shown in line 415), the network management device 120 detects that the corresponding network device is experiencing network degradation. Similarly, network KPIs and system parameters are also used for determining whether a network device is experiencing network degradation. As it may be known to the person skilled in the art, the degradation in the network may be detected based on a grouping of at least one network KPI from the above-described performance, system and radio KPIs. For example, a degradation may be detected based on an increase in RSSI, a decrease to signal to interference and noise ration (SINR) and an increase in packet error rate (PER) above their predefined thresholds.

Subsequent to determining all the network devices that are experiencing network degradation, then based on network topology, the network management device 120 can determine whether one or more devices are within a predetermined proximity to each other in geographical or network terms. Network topology herein refers to a physical layout comprising location information of the network devices installed in the industrial facility along with the physical and logical interconnections amongst the network devices. For example, two network devices are considered to be proximate to one another when they are connected to each other or are connected to the same gateway device. In another example, two network devices are considered to be proximate to one another when they are with a predefined distance of each other's geographical location in the industrial facility. Then, based on the proximate network devices experiencing network degradation, the network management device detects the section of the network experiencing degradation. The section of the network comprises the proximate network devices experiencing network degradation. This is explained further using examples below.

In an example, the network management device 120 determines that network device 154 and automated guidance vehicle 158 are experiencing network degradation based on the network quality information from the network device 154 and automated guidance vehicle 158. From the network topology, the network management device 120 can determine the network device 154 and automated guidance vehicle 158 are connected to the same gateway device 150. Accordingly, the network management device 120 determines a section of the network having degradation, the section comprising the network device 154 and automated guidance vehicle 158.

In an example, the network management device 120 is configured to determine whether the detected degradation in the section of the network is caused by a known interference source or an unknown interference source (including the malicious interference source 180). In an example, prior to the commissioning of the wireless network, a drive test for measurement of background radio Interference is conducted. The drive test determines the degree to which the radio spectrum within the industrial facility is clean from interference. Subsequent to the drive test, pre-existing interference sources within the industrial facility are identified.

Accordingly, the network management device 120 includes a list of known interference sources along with geographical information indicative of the range of the interference. In an example, the list of interference sources includes at least one interference source associated with operation of industrial assets such as welding machines, motors, and/or other radio sources. If the degradation in the section of the network is due to a known interference source, then the network management device 120 terminates the method 200. If the degradation is not due to an interference source from the list of interference sources, then the interference source is deemed as a malicious or unknown interference source and the network management device 120 continues to step 230.

At step 230, the network management device 120 then determines a geographical area associated with the section of the network based on the network quality information from the at least one network device (170, 160, 164) in the section of the network. The geographical area serves as the target area within which the interference source is assumed to be operating.

For determining the geographical area, the network management device 120 determines the locations of the at least one network devices in the section of the network. In an example, where the network device is a gateway device, the network management device 120 can determine a location of the gateway device based on the network topology associated with the wireless network. Using the network device identifier, the network management device 120 can determine the location of the corresponding network device from the network topology. In another example, where the network device is a mobile device, the location of the corresponding mobile device may be determined from the location information sent as a part of the network quality information by the corresponding mobile device. In yet another example, where the network device is a mobile device incapable of sending its location information, the network management device 120 can determine the location of the mobile device by triangulation using at least one network device within the radio communication range of the mobile device or by any other positioning technique. In an additional example, a localization system may also be used.

Based on the locations of the network devices in the section of the network, the network management device then determines the geographical area. In an example, the network management device determines the geographical area of a predetermined size comprising all the locations of the at least one network devices. In an example, the geographical area is determined based on the locations of the network devices and the radio range of the network devices. In an example, antenna characteristics and antenna orientation of the network device may be further used to determine the geographical area.

At step 240, the network management device next determines a location of the interference source 180 based on measurements of the at least one network KPI from at least one mobile unit in the geographical area. Continuing from step 230, once the network management device 120 has determined the geographical area within which the interference source is present, the network management device 120 relies on at least one network device that is mobile (also referred to as a mobile unit) to take a plurality of measurements in the geographical area to localize the interference source. Mobile units are capable of determining their position and can determine the direction and orientation of the antenna during measurements of network KPIs. The mobile units are equipped with 2D or 3D radio antenna phased arrays.

In order to do so, the network management device 120 determines the at least one mobile unit in coordination with a control system associated with the industrial facility. Then, the network management device 120 requests the at least one mobile unit to transmit measurements of the network KPIs as they traverse the determined geographical area. The network management device 120 provides each mobile unit with a route plan comprising a plurality of locations within the determined geographical area for measurements. In an example, where substantial interference exists within the determined geographical area, the mobile units are configured to take the measurements within the determined geographical area and come out of the determined geographical area. Subsequent to coming out of the geographical area, and the mobile units connect to the nearest gateway device to transmit the measurements to the network management device 120.

Then, based on the measurements, the network management device 120 can determine the area or location of the interference source in the industrial facility. In an example, based on the antenna direction and orientation information from the mobile units, the network management device 120 can localize the interference sources. In another example, the network management device 120 triggers a positioning service available in the wireless network for localizing the interference source. For example, this could be performed using a radio localization device 130 that can use a plurality of techniques for localizing the interference source. The radio localization device 130 provides information about the interference source, based on power and angle of arrival, to the network management device 120. The network management device 120 utilizes the information from the radio localization device 130 together with the measurements from the mobile units to determine the location of the interference source.

In an example, the network management device is further configured to coordinate with a radio localization device 130 for determining the geographical area and for localizing the interference source. The radio localization device is a diagnostic device comprising at least one set of directional antennas fixed along a plurality of corresponding directions. The radio localization device is capable of performing RF spectrum analysis to determine the shape and the spread of the interference source. This information is then forwarded to the network management device 120 and is used in the determination of the interference source.

In an example, the at least one mobile unit includes an automated guidance vehicle 158 that coordinates with the network management device 120 to detect the position of the interference source. This is explained further in reference to FIG. 3.

Figure 3:
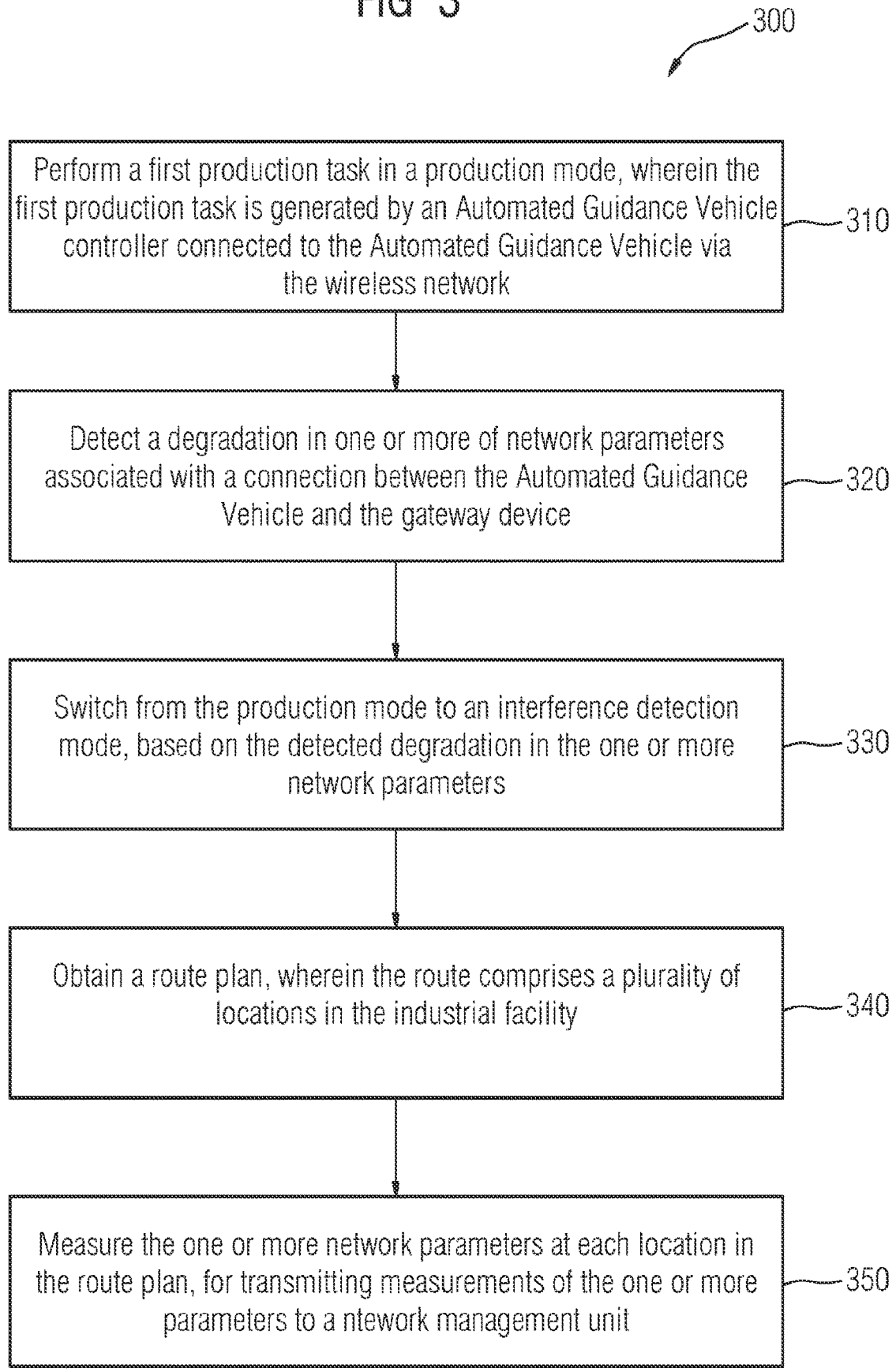
FIG. 3 illustrates an exemplary method of determining an interference source by an automated guidance vehicle in an industrial facility in accordance with the invention.

FIG. 3 illustrates a method 300 of detecting the interference source 180 by the automated guidance vehicle 158 in an industrial facility. The method 300 is performed by the automated guidance vehicle 158 in coordination with the network management device 120. At step 310, the automated guidance vehicle 158 performs a first production task in a production mode. The first production task is generated by an automated guidance vehicle controller connected to the automated guidance vehicle 158 via the wireless network. The automated guidance vehicle controller is connected to the control system of the industrial facility for controlling a plurality of automated guidance vehicles.

The first production task is an industrial task performed by the automated guidance vehicle 150. The first production task may be an industrial task performed by the automated guidance vehicle 150, in relation to various aspects within the industrial facility, such as maintenance, production, and/or logistics. For example, the first production task includes a transportation task where the automated guidance vehicle is responsible for carrying raw materials from a first station to a second station. The automated guidance vehicle is equipped with a plurality of sensors for performing the first production task. For example, the automated guidance vehicle is equipped with navigation sub system and at least one RFID readers to assist in guiding the automated guidance vehicle. The first production task may also be an idle task where no actual tasks have been assigned to the automated guidance vehicle and the controller has set the automated guidance vehicle to an idle state.

At step 320, the automated guidance vehicle 158 then detects a degradation in at least one of network KPIs associated with a connection between the automated guidance vehicle and the gateway device. In an example, the automated guidance vehicle in coordination with the network management device 120, the automated guidance vehicle 158 detects a degradation in at least one network KPI when the values of the network KPI is outside of a certain predefined range or if the rate of change in the value of the network KPI is above a certain predefined threshold. The detected degradation is caused by at least one jamming signals from the interference source.

Next, at step 330, based on the detected degradation, the automated guidance vehicle 158 switches from the production mode to an interference detection mode. In an example, the network management device 120 instructs the automated guidance vehicle 158 to switch from the production mode to an interference detection mode, after evaluating a degree of the degradation in the connection between the automated guidance vehicle and the gateway device. In the example, the first production task includes a task priority that is determined by the automated guidance vehicle controller while assigning the first production task to the automated guidance vehicle 158. Based on the degree to which a network KPI is outside of the predefined range and the task priority, the network management device 120 decides whether the automated guidance vehicle must switch from the production mode to the interference detection mode.

In another example, the network degradation is not severe enough to affect the current production task. Here, the network management device 120 decides not to switch the automated guidance vehicle from the production mode to the interference detection mode. For example, the data rate and the data latency are no longer in the predefined range. However the current production task has high priority and does not require coordination with any other network device. In such a case, the network management device 120 may not switch the automated guidance vehicle from the production mode to the interference detection mode.

Next, at step 340, the automated guidance vehicle 158 obtains a route plan. The route plan comprises a plurality of locations in the industrial facility.

In an example, the route plan is determined and transmitted to the automated guidance vehicle by the network management device 120. In the example, the network management device 120 determines the route plan for the automated guidance vehicle 158 based on network topology of the section of the network and the received network quality information from the plurality of network devices.

Figure 5:
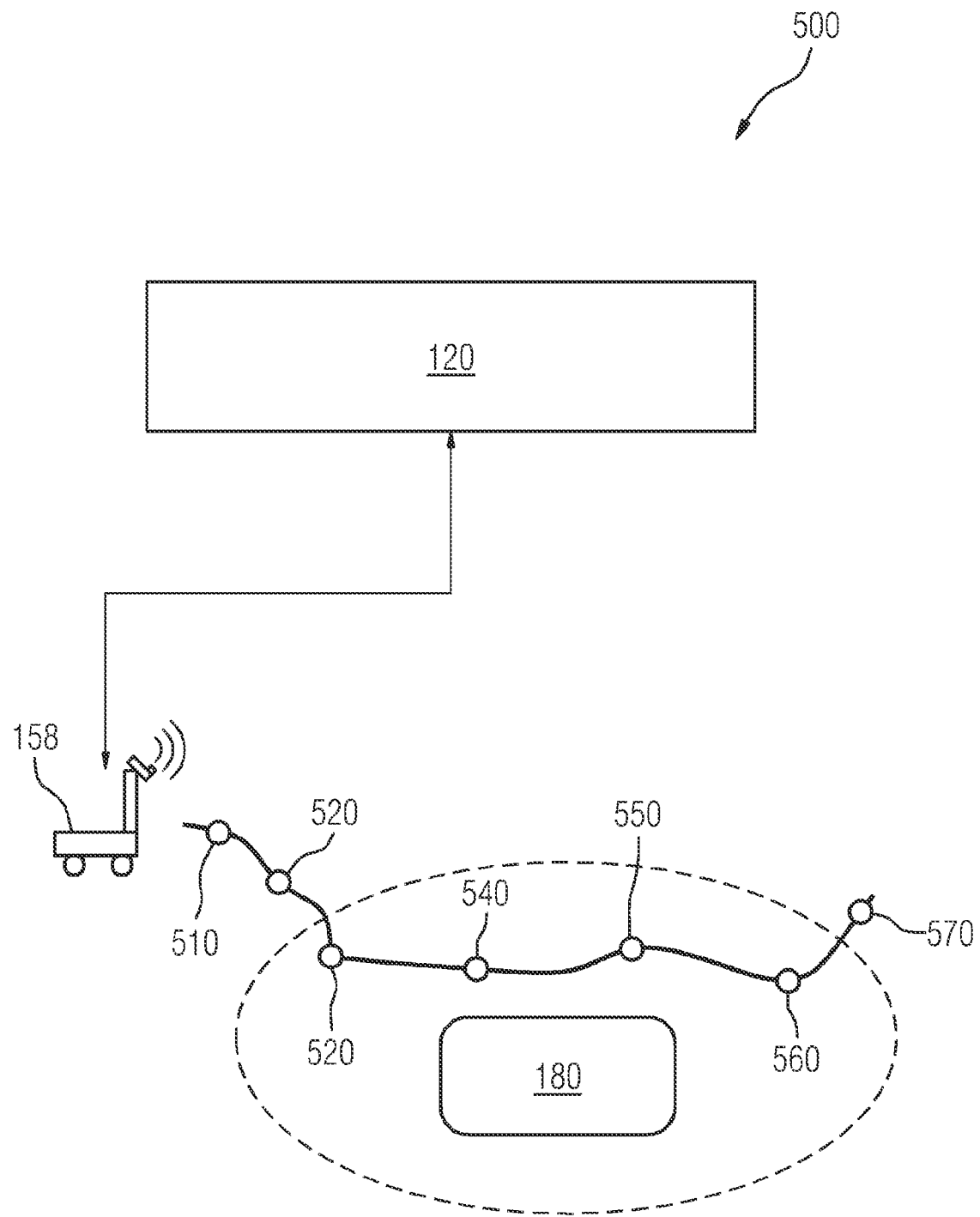
FIG. 5 illustrates an exemplary route plan for the automated guidance vehicle for determining the interference source in accordance with the invention.
Figure 6:
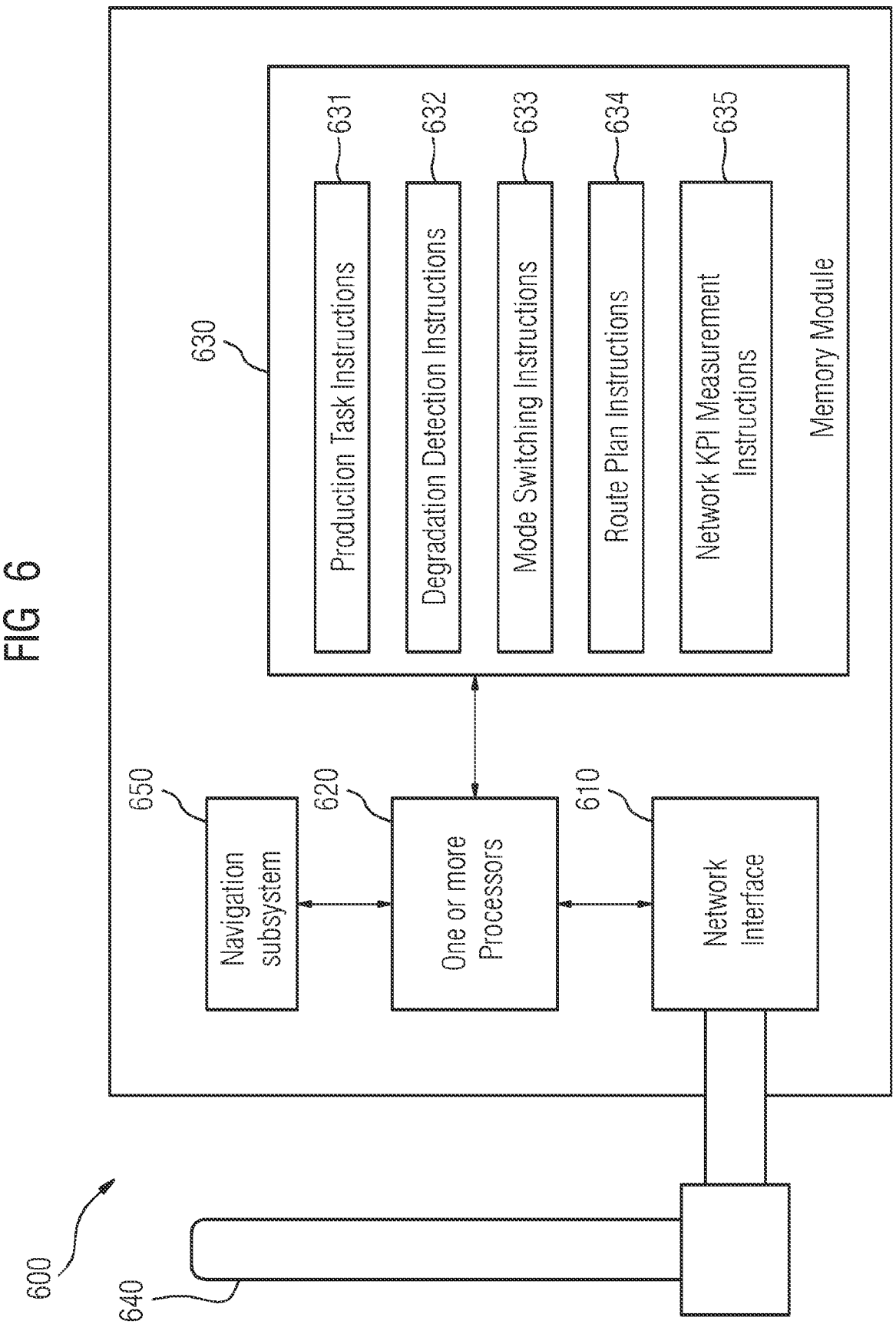
FIG. 6 is a block diagram of an exemplary automated guidance vehicle for determining an interference source in the wireless network in the industrial facility.
Figure 7:
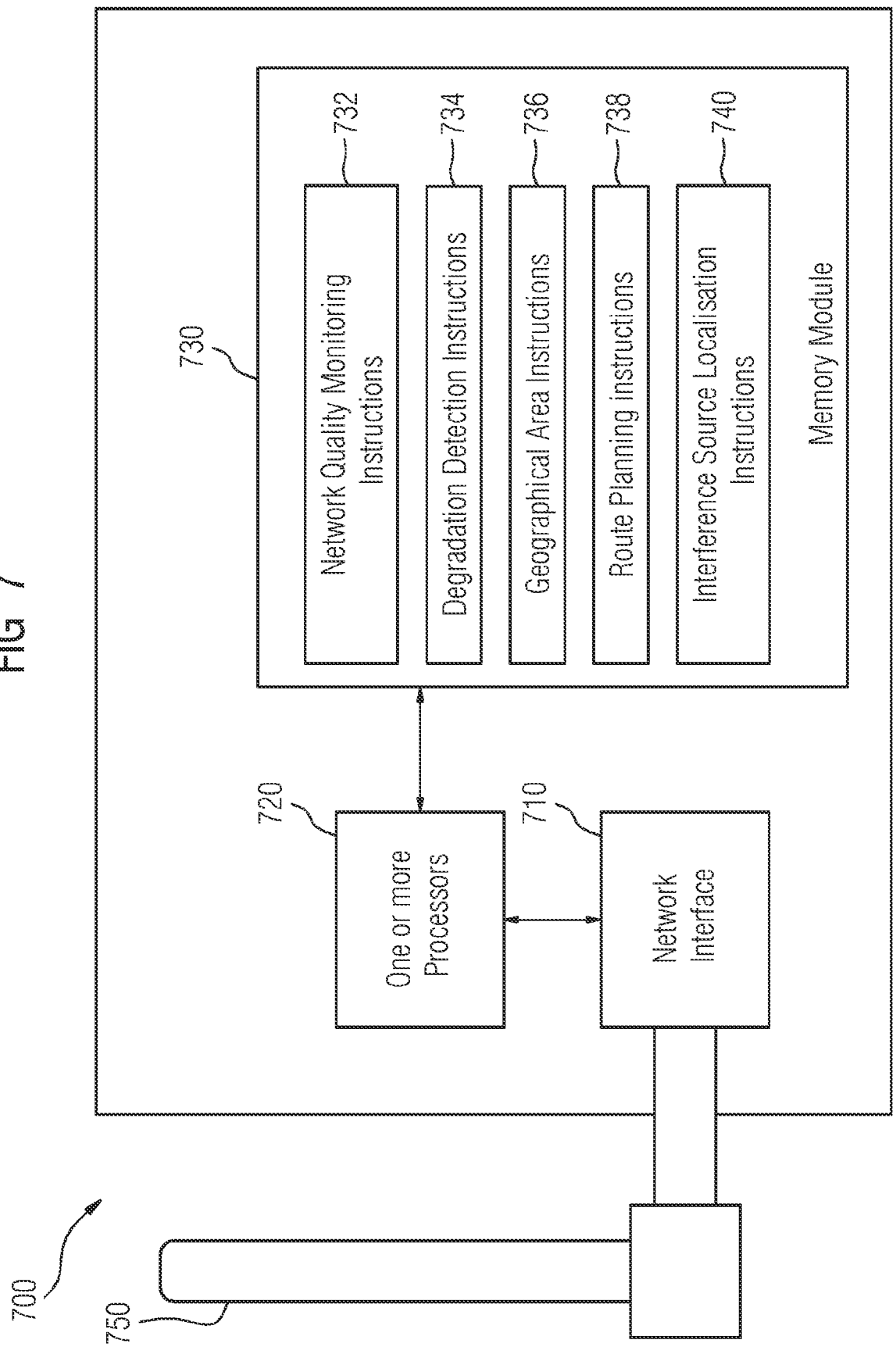
FIG. 7 is a block diagram of an exemplary network management device for determining an interference source in the wireless network in the industrial facility in accordance with the invention.

More particularly, the network management device 120 determines the route plan for optimally covering the determined geographical area as previously mentioned in method 200. As mentioned in step 230 of the method 200, the network management device 120 determines the geographical area within which the interference source may be operating based on the at least one network information from the network devices in the section of the network experiencing degradation in the network. Then, the network management device determines a plurality of locations for optimally covering the geographical area. An exemplary route plan is illustrated in FIG. 5. The route plan comprises locations 510, 520, 530, 540, 550, 560 and 570. The automated guidance vehicle 158 proceeds to each location in the route plan and measures the network KPIs and transmits the measurements to the network management device 120.

Next, at step 350, the automated guidance vehicle 158 measures the at least one network KPI at each location in the route plan, for transmitting measurements of the at least one network KPI to a network management device associated with the wireless network. Accordingly, the automated guidance vehicle then transmits the measurements of the at least one network KPI from each location in the route plan to the network management device. The measurements of at least one network KPI from the plurality of locations in the route plan, is then used by the network management device for detecting a location of the malicious interference source using the techniques mentioned above.

In an example, the automated guidance vehicle is equipped with non-omni directional antennas. Accordingly, the automated guidance vehicle takes a couple of measurements at each location using its radio antenna, a first measurement in a first orientation and a second measurement in a second orientation. For example, the automated guidance vehicle may be equipped with a rotatable antenna via which it can take the first and second measurements in the first and second orientations. In another example, the automated guidance vehicle is equipped with a fixed antenna and is capable of moving itself into the first and second orientation to take the first and second measurements. Based on the first measurement and the second measurement taken in the same location, the network management device 120 can determine the position of the interference source more accurately. In an example, the multiple measurements are taken such that the measurements are executed over 360 degrees to identify the source of interference. In an example, the automated guidance vehicle is equipped with at least one camera and is capable of taking pictures or videos of the locations in the route plan while taking the measurements of the network KPIs. In an example, the orientation of the camera is determined based on the orientation of the radio antenna during the measurements. This is to ensure the camera is directed in the same direction as the antenna performing the measurements. In an example, where the automated guidance vehicle includes a fixed camera, the automated guidance vehicle is configured to rotate itself to the orientation of the antenna to capture images with the fixed camera. In an example, field strength of the jamming signal is overlaid with the images or videos to analyze and determine the location of the malicious interference source.

It is to be noted by a person skilled in the art, that while the above methods are explained using one automated guidance vehicle, a plurality of automated guidance vehicles may also be used in a similar fashion. Additionally, the above-mentioned methods may also be realized by at least one dedicated diagnostic automated guidance vehicles that are only capable of working in the interference detection mode.

The present disclosure can take a form of a computer program product comprising program modules accessible from computer-usable or computer-readable medium storing program code for use by or in connection with at least one computer, processing units, or instruction execution system. For example, the functions of the network management device 120 or the automated guidance vehicle 150 may be realized across at least one device. Additionally, the network management device 120 may be realized as a module of the control system.

Accordingly, the current disclosure describes an automated guidance vehicle 600 for detecting an interference source. The automated guidance vehicle 600 includes a network interface 610, at least one processor 620 and a non-transitory storage medium 630. The network interface 610 (including an example antenna 640) is configured to connect to an automated guidance vehicle controller and the network management device via the gateway device 150. The non-transitory storage medium 630 contains a plurality of instructions (631, 632, 633, 634 and 635) which, when executed by the processors 620, cause the processors 620 to detect the interference source. This is further explained below.

At the execution of the production task instructions 631, the at least one processor 620 performs a first production task in a production mode, wherein the first production task is generated by an automated guidance vehicle controller connected to the automated guidance vehicle via the wireless network. At the execution of the degradation detection instructions 632, the at least one processor 620 (along with the network management device 120) detects a degradation in at least one network KPI associated with a connection between the automated guidance vehicle and a gateway device 150. At the execution of the mode switching instructions 633, the at least one processor 620 switches from the production mode to an interference detection mode, based on the detected degradation in the at least one network KPI. At the execution of the route plan instructions 634, the at least one processor 620 obtains a route plan, where the route plan comprises a plurality of locations in the industrial facility. At the execution of the network KPI measurement instructions 635, the at least one processor 620 measures the at least one network KPI at each location in the route plan, for transmitting measurements of the at least one network KPI to a network management device 120 associated with the wireless network. To enable the movement of the automated guidance vehicle 600, the at least one processor 620 is connected to a navigation subsystem 650 for navigating itself around the industrial facility. The navigation subsystem 650 is configured to determine the position and the driving orientation of the automated guidance vehicle 600. In an example, the navigation subsystem 650 is capable of working autonomously when the communication with the wireless network is interrupted. The measurements of at least one network KPI from the plurality of locations in the route plan, is used by the network management device 120 for detecting a location of the interference source 180.

Similarly, the current invention discloses a network management device 700 for detecting an interference source. The network management device 700 includes a network interface 710, at least one processor 720 and a non-transitory storage medium 730. The network interface 710 (including an example antenna 750) is configured to connect to the network devices of the wireless network. The non-transitory storage medium 630 contains a plurality of instructions (732, 734, 736, 738 and 740) which, when executed by the processors 720, cause the processors 720 to detect the interference source. This is further explained below.

At the execution of the network quality monitoring instructions 732, the at least one processor 720 receives network quality information from a plurality of network devices (140, 150, 154, 158, 160, 164, 170), where network quality information from a corresponding network device includes at least one network KPI indicative of signal quality at a corresponding network device, and a network identifier of the corresponding network device. Then, at the execution of the degradation detection instructions 734, the at least one processor 720 detects a degradation in a section of the network based on the network quality information from at least one network devices (160, 164, 170) from the plurality of the network devices (140, 150, 154, 158, 160, 164, 170), where the section of the network comprises the at least one network device (160, 164, 170). Then at the execution of the geographical area instructions 736, the at least one processor 720 determines a geographical area associated with the section of the network based on the network quality information from the at least one network devices (160, 164, 170) in the section of the network. Then, at the execution of the interference source localization instructions 740, the at least one processor 720 determines a location of the malicious interference source (180) based on measurements of the at least one network KPIs from at least one mobile unit (170) in the geographical area.

For the purpose of this description, a computer-usable or computer-readable non-transitory storage medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology can be centralized or distributed (or a combination thereof) as known to those skilled in the art.

While the current disclosure is described with references to few industrial devices, a plurality of industrial devices may be utilized in the context of the current disclosure. While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be applied to device/non transitory storage medium claims.

What is claimed is:

1. A method for detecting an interference source in a wireless network in an industrial facility, the wireless network comprising a plurality of network devices, the method being implemented by a network management device and comprising:
   a) receiving network quality information from the plurality of network devices, the network quality information from a corresponding network device including at least one network key performance indicator (KPI) indicative of signal quality at the corresponding network device, and a network identifier of the corresponding network device;
   b) detecting a degradation in a section of the wireless network based on the network quality information from at least one device from the plurality of the network devices, the section of the wireless network comprises the at least one network device;
   c) determining a geographical area associated with the section of the wireless network based on the network quality information from the at least one network device in the section of the wireless network;
   d) determining a route plan and transmitting the route plane to an automated guidance vehicle based on the determined geographical area and network topology of the section of the wireless network for covering the geographical area, said determining the route plan comprising determining a plurality of locations in the geographical area for covering the geographical area;
   e) determining a location of the interference source based on measurements of the at least on network KPI measured at the plurality of locations in the geographical area, from the automated guidance vehicle; and
   f) controlling the automated guidance vehicle to proceed to each location from the plurality of locations in the route plan and measuring the at least one network KPI at the each location of the plurality of locations;
wherein the route plan for the automated guidance vehicle comprises the plurality of locations in the geographical area.

2. The method as claimed in claim 1, wherein the plurality of network devices comprises at least one gateway device affixed to a plurality of locations in the industrial facility, and at least one user devices connected to the wireless network via the at least one gateway device.

3. The method as claimed in claim 2, wherein network quality information from each user device from the at least one user device, further comprises location information indicative of a location of a corresponding user device.

4. The method as claimed in claim 1, wherein the at least one network KPI includes a Residual Signal Strength Indicator, a Signal to Interference plus Noise Ratio and a Packet Error Rate.

5. The method as claimed in claim 1, wherein determining a geographical area associated with the section of the wireless network comprises:
   a) determining a location of a network device from the at least one network device based on a network identifier of the corresponding network device and network topology of the wireless network; and
   b) determining the geographical area based on the at least one location of the at least one network device in the section of the wireless network.

6. The method as claimed in claim 1, wherein the method further comprises coordinating with a radio localization module comprising at least one set of directional antennas fixed along a plurality of corresponding directions.

7. The method as claimed in claim 1, wherein the method further comprises:
   a) determining a location for positioning at least one mobile gateway device, the location being determined based on at least one location of the at least one network device of the section of the wireless network; and
   b) transmitting location information of the determined location to the at least one mobile gateway device, the at least one mobile gateway device being configured to move to the determined location upon receiving the location information of the determined location;
      wherein each user device from the at least one user device in the section of the wireless network is configured to connect to the at least one mobile gateway device when the at least one mobile gateway device reaches the determined location.

8. The method as claimed in claim 7, wherein the at least on mobile gateway device is connected to a backbone network.

9. A method of measuring at least one network key performance indicator (KPI) for detecting an interference source, by an automated guidance vehicle in an industrial facility, the automated guidance vehicle being connected to a wireless network via a gateway device, the method comprising:
   a) performing a first production task in a production mode, the first production task being generated by an automated guidance vehicle controller connected to the automated guidance vehicle via the wireless network;
   b) detecting a degradation in the at least one network KPI associated with a connection between the automated guidance vehicle and the gateway device;
   c) switching from the production mode to an interference detection mode based on the detected degradation in the at least one network KPI;
   d) obtaining a route plan which comprises a plurality of locations in the industrial facility and transmitting the route plane to the automated guidance vehicle;
   e) controlling the automated guidance vehicle to proceed to each location from the plurality of locations in the route plan, measuring the at least one network KPI at the each location in the route plant and transmitting measurements of the at least one network KPI to a network management device associated with the wireless network;
wherein the plurality of locations of the route plan are in a geographical area associated with a section of the wireless network comprising at least one network device; and
wherein the detected degradation is caused by at least one jamming signal from the interference source in the geographical area.

10. The method as claimed in claim 9, wherein measuring the at least one network KPI at the each location comprises measuring the at least one network KPI utilizing a radio antenna of the automated guidance vehicle in a first orientation and measuring the one or more KPIs using the radio antenna of the automated guidance vehicle in a second orientation.

11. The method as claimed in claim 9, wherein switching from the production mode to the interference detection mode comprises evaluating a degree of the degradation in a connection between the automated guidance vehicle and the gateway device.

12. A network management device for detecting an interference source in a wireless network in an industrial facility, the wireless network comprising a plurality of network devices, the network management device comprising:
  a) at least one network interface for communicating with at least one network device in the wireless network;
  b) at least one processor connected to a memory module, the at least one processor being configured to:
  i) receive network quality information from a plurality of network devices, the network quality information from a corresponding network device including at least one network key performance indicator (KPI) indicative of signal quality at a corresponding network device, and a network identifier of the corresponding network device;
  ii) detect a degradation in a section of the wireless network based on the network quality information from at least one network device from the plurality of the network devices, the section of the wireless network comprising the at least one network device;
  iii) determine a geographical area associated with the section of the network based on the network quality information from the at least one network device in the section of the wireless network;
  iv) determine a route plan and transmit the route plan to an automated guidance vehicle based on the determined geographical area and network topology of the section of the wireless network for covering the geographical area, determining the route plan comprising determining a plurality of locations in the geographical area for covering the geographical area; and
  v) determine a location of the interference source based on measurements of the at least one network KPI in the geographical area from the automated guidance vehicle;
wherein the route plan for the automated guidance vehicle comprises the plurality of locations in the geographical area; wherein the automated guidance vehicle is controlled to proceed to each location from the plurality of location in the route plan and measure the at least one network KPI at the each location from the plurality of locations.

* * * * *